(12) United States Patent
Cheek et al.

(10) Patent No.: US 8,543,465 B2
(45) Date of Patent: Sep. 24, 2013

(54) METHOD AND SOFTWARE PRODUCT FOR PERSONALIZED MEETING AND RELATIONSHIP ESTABLISHING

(75) Inventors: Lori Cheek, New York, NY (US); Locke Raper, New York, NY (US); Charlie Kickham, New York, NY (US)

(73) Assignee: Cheek'd, Inc, New York, NY (US)

( * ) Notice: Subject to any disclaimer, the term of this patent is extended or adjusted under 35 U.S.C. 154(b) by 72 days.

(21) Appl. No.: 12/917,244

(22) Filed: Nov. 1, 2010

(65) Prior Publication Data

US 2012/0054053 A1    Mar. 1, 2012

Related U.S. Application Data

(60) Provisional application No. 61/257,035, filed on Nov. 1, 2009.

(51) Int. Cl.
*G06Q 30/00*    (2012.01)
(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

2007/0156497 A1*  7/2007  Ramsey ........................ 705/8

* cited by examiner

*Primary Examiner* — Mila Airapetian
(74) *Attorney, Agent, or Firm* — Catherine Napjus; Michael Persson; Lawson Persson & Weldon-Francke, PC

(57) ABSTRACT

A method, software product and card for personal online/offline meeting. The method includes the steps of an initiator developing a profile/account with a central organization; the central organization providing the initiator with a number of cards on which are printed at least a website designation and a code; the initiator giving a card to at least one recipient; the recipient going to the website designated on the card; the recipient entering the code at the designated website; the recipient being given access to the initiator's profile with the central organization; and the recipient sending the initiator a message through the designated website.

2 Claims, 5 Drawing Sheets

METHOD AND SOFTWARE PRODUCT FOR PERSONALIZED MEETING AND RELATIONSHIP ESTABLISHING

CLAIM OF PRIORITY

This application claims the benefit of priority of U.S. Provisional Patent Application No. 61/257,035, filed on Nov. 1, 2009.

FIELD OF THE INVENTION

The present invention relates to a method, software product, and card for initiating meeting and personal relationship establishment between people, and in particular to a method for initiating an online relationship with a personal offline introduction.

BACKGROUND

Meeting people, particularly without an intermediary for introduction, is difficult for many people. In order to meet new people, many people have turned to online dating services, such as that marketed under the registered trademarks EHARMONY dating services. Both of these online dating services involve individuals providing an online dating profile and choosing people they want to contact by perusing others' profiles. Although many people succeed in their dating goals through such services, many do not, as the services have several drawbacks. Importantly, many customers of these services find the process overly impersonal as there is no personal meeting before the impersonal perusal of profiles. Moreover, many people are deceptive in their profiles by including very old pictures of themselves or lying about their age so that upon actual meeting, one party may be surprised or disappointed in the other, almost as though the disappointed party were the victim of false advertising. Such online dating services are a natural progression of the digital age and address many difficulties in dating, such as an initial level of anonymity from prospective daters and information provision about prospective daters that can add an element of personal safety to later meetings in person. However, such online dating service also effectively preclude the initial chemistry or spark, not to mention instantaneous physical assessment, that may occur even during the very briefest of personal interactions that precede traditional or "old fashioned" dating. This preclusion leads to the problems such as those discussed above. Therefore there is a need for an online dating service that incorporates the traditional first step of an in person meeting.

SUMMARY OF THE INVENTION

The present invention includes a method and software product for personal meeting, and cards for facilitating the meeting.

In its most basic form the method of the present invention includes the following steps: an initiator developing a profile/account with a central organization; the central organization providing the initiator with a number of cards on which are printed at least an icebreaker, a website designation, and a code; the initiator giving a card to at least one recipient; the recipient going to the website designated on the card; the recipient entering the code at the designated website; the recipient being given access to the initiator's profile with the central organization; and optionally the recipient sending the initiator a message through the designated website. All steps of the method, therefore, are performed by an initiator, a central organization, and/or a recipient.

The first step of an initiator developing a profile/account with a central organization preferably includes the following sub-steps: the initiator navigating to a designated website, preferably www.cheekd.com; the initiator choosing an option to "join," which is provided on the designated website; the initiator providing information, including a valid email address, a password, a code to validate or confirm that the initiator is a human and not a machine, billing information, shipping address, and personal profile information; the central organization storing the information provided into an initiator-specific profile; the central organization processing payment; the central organization activating the initiator's profile; and the central organization assigning a unique alpha-numeric ID number to the initiator's profile/account.

The second step of the central organization providing the initiator with a number of cards on which are printed at least an icebreaker, a website designation, and a code includes printing at least one card and sending the card or cards to the initiator. As referred to herein, the "icebreaker" printed on the card is a line of text that includes any of several short, cute or flirtatious phrases, such as "Act natural. We can get awkward later.", "Don't overthink this.", or "Emotionally available." The icebreaker is a written substitute for an opening oral remark that someone might make to a stranger that he wants to meet. The text in the icebreaker itself is not a trademark or slogan of the central organization. The use and appearance of such icebreakers on a card as described in the method of the present invention may ultimately act as a designation of source for the central organization, but the icebreakers or phrases themselves are not. This step preferably also includes the initiator activating the cards by signing into his account and entering the code from a card, which links or "marries" the card to the initiator's account.

The third step of the initiator giving a card to at least one recipient preferably includes the steps of meeting the recipient in person and physically handing the card to the recipient. However, in some embodiments, the step of giving the card to at least one recipient may occur electronically over the Internet or physically through an intermediary.

The fourth step of the recipient going to the website designated on the card includes the steps of the recipient navigating to the designated website and being provided instructions via the designated website that prompt the recipient to enter the code from the card.

The fifth step is the recipient entering the code at the designated website as prompted by the website. This step may be achieved by the recipient typing in the code. Alternatively, if the card includes a barcode carrying the code, the step may be achieved by the recipient scanning in the barcode.

The sixth step is the recipient being given access to the initiator's profile with the central organization. This step also entails the central organization sending the initiator an indication that a recipient has been granted access to the initiator's profile.

The seventh optional step of the recipient sending the initiator a message through the designated website occurs if the recipient wishes to contact the initiator. This step preferably includes the steps of the recipient logging in, and composing and sending a message to the initiator through the designated website. The step of logging in preferably includes the step of the recipient supplying the central organization with an email address and password via the designated website. If the seventh step occurs, in some embodiments, the method of the present invention includes an eighth step of the initiator responding to the recipient through the designated website.

The preferred method also includes the steps of the central organization billing the initiator, the initiator tracking card distribution, the initiator tracking activity, and the initiator ordering custom decks of cards. The step of the initiator tracking card distribution preferably entails the central organization providing an application on the designated website that allows the initiator to enter data corresponding to each card and the initiator entering such data. The application provides the initiator with the icebreaker included on a card, and one or more data entry fields into which the initiator may enter notes corresponding to that icebreaker or card bearing that icebreaker, such as notes about the recipient and the circumstances under which the initiator gave the card bearing the icebreaker to the recipient. In some embodiments, the application also provides the initiator with the code included on the card that bears the icebreaker, in addition to the icebreaker. The step of the initiator tracking activity entails the central organization recording and providing the initiator with how many times a recipient enters a code and how many times a recipient sends a message to the initiator when presented with a card bearing a specific icebreaker and the initiator considering this data. The step of the initiator ordering custom decks of cards entails the central organization providing the initiator with an application on the designated website for customizing which icebreakers are included on the cards included in a deck to be provided to the initiator, and how many cards bearing the icebreakers are included in the deck, and the initiator ordering customized decks of cards using this application. The icebreakers chosen by the initiator may be standard icebreakers provided as options by the central organization, or they may be icebreakers created by the initiator. If the icebreakers are created by the initiator, then the method also includes the step of the central organization approving the icebreaker before providing the initiator with cards bearing the initiator-provided icebreaker.

In its most basic form, the software product of the present invention includes account creation software, card software, account features software, recipient software, validation software, and billing software.

Account creation software includes data capture software for providing data capture fields into which the initiator may enter information into the central organization's website; profile storage software for storing information provided by the initiator into an initiator-specific profile/account; assignment software for assigning a unique alphanumeric ID to the initiator-specific profile/account; and activation software for activating, deactivating, or reactivating the initiator's profile/account.

Card software includes card code setting software, card provision software, and card activation software. Card code setting software is for developing a code for inclusion on the card that will include both elements corresponding to the icebreaker included on the card and elements corresponding to the initiator. Card provision software is for sending a printer instructions for printing at least one card including the code developed by the card code setting software, a website designation, and the icebreaker to which the code corresponds, and sending the card(s) to a specific destination. Card activation software is for processing input from an initiator including a code from the card(s) and associating the card(s) with the initiator's profile/account.

Account features software includes messaging software, notes software, tracking software, ordering software, and customization software. These are features available to the initiator through his account. Messaging software provides a messaging feature that allows the initiator to send and receive messages to and from the central organization and recipients when he signs into his profile/account. Messages from the central organization may include notices about the initiator's profile/account and/or notifications that a recipient has entered a code from a card given to the recipient by the initiator. Notes software provides a note feature that allows the initiator to make notes about the distribution of a specific card within his account. Tracking software tracks how many recipients entered a code and/or sent a message to the initiator based on the icebreaker on the card provided to the recipient and provides the initiator with this data. Ordering software enables an ordering feature allowing the initiator to order decks of cards. Customization software is part of the ordering software that allows the initiator to order decks of cards made up of initiator-specified quantities of cards bearing an initiator-specified icebreaker.

Recipient software includes code software, barcode software, profile access software, and account software. Code software provides the recipient with a data capture field to type in the alphanumeric code included on the card given to the recipient and allows the central organization to associate that code with the initiator. Barcode software allows the central organization to read a barcode scanned from a card given to a recipient and associate that code with the initiator. Profile access software allows the recipient access to the profile information provided by the initiator after the recipient has entered the code on the card given to him by the initiator. Account software allows the recipient to create an account by entering his email address, password, and password confirmation and to indicate an already created account by reentering the email address and password.

Validation software is for verifying that an initiator creating a profile/account and/or a recipient interested in sending an initiator a message is a human, rather than a machine by providing a data capture field for a code to be entered by the initiator or recipient.

Billing software is for billing the initiator.

In its most basic form, the card of the present invention includes at least an icebreaker, a code, and a website designation. The cards are preferably similar to standard business cards in size, shape, and dimensions, and include the icebreaker, code, and website address on one side of the card, and a company logo on the other side.

The code is preferably an alphanumeric code or a barcode. Some cards may include both an alphanumeric code and a barcode corresponding to the alphanumeric code. It is preferred that part of the code, two of eight characters in an alphanumeric code, for example, correspond to the icebreaker included on the card. This part of the code will vary from card to card, depending on the icebreaker included on the card. The remainder of the code is preferably associated with an initiator account and is the same on every card in a deck. Before a deck has been activated by an initiator, the part of the code not corresponding to the icebreaker is preferably not associated with a specific initiator. Once the initiator receives a card or deck of cards, he may activate the cards through his account, and in this way marry the code to his account.

The icebreaker may be any of several provided by the central organization or may be created by the initiator, pending central organization approval. The icebreakers included on the cards of the deck and the quantity of cards bearing a certain icebreaker may be assigned by the central organization. Alternatively, the initiator may specify the quantity of cards bearing specific icebreakers that are included in a deck.

Therefore it is an aspect of the present invention to provide a method for an online dating service that includes traditional, in person features.

It is a further aspect of the present invention to provide a method that may include an initial personal meeting with a personalized meeting procedure and subsequent online individualized contact.

It is a further aspect of the present invention to provide a method for making notes on card distribution.

It is a further aspect of the present invention to provide a method for tracking success of card distribution based on icebreakers included on the cards.

It is a further aspect of the present invention to provide a method wherein an initiator maintains security and control over his contact information.

It is a further aspect of the present invention to provide a software product capable of performing the online steps of the method of the present invention.

It is a further aspect of the present invention to provide a card that include a code corresponding to both the user of the card and the icebreaker included on the card.

These aspects of the present invention are not meant to be exclusive and other features, aspects, and advantages of the present invention will be readily apparent to those of ordinary skill in the art when read in conjunction with the following description, accompanying drawings, and claims.

DETAILED DESCRIPTION

Figure 1:
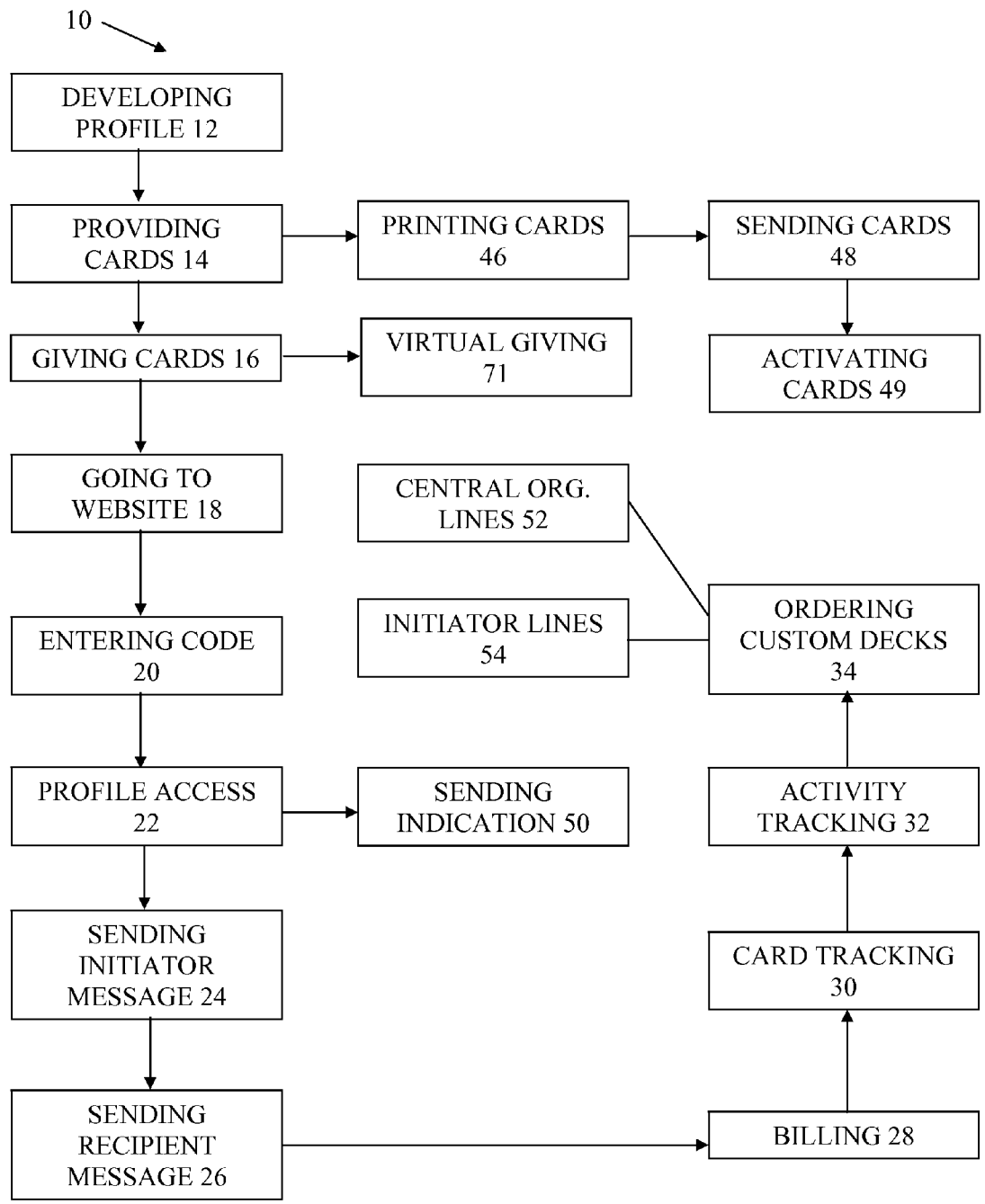
FIG. 1 is a flow chart showing the steps of the method of the present invention.

Referring first to FIG. 1, in its most basic form, the method 10 of the present invention includes the following steps: an initiator developing a profile/account with a central organization 12; the central organization providing the initiator with a number of cards on which are printed at least a website designation and a code 14; the initiator giving a card to at least one recipient 16; the recipient going to the website designated on the card 18; the recipient entering the code at the designated website 20; the recipient being given access to the initiator's profile with the central organization 22; and optionally the recipient sending the initiator a message through the designated website 24. All steps of method 10, therefore, are performed by an initiator, a central organization, and/or a recipient.

Figure 2:
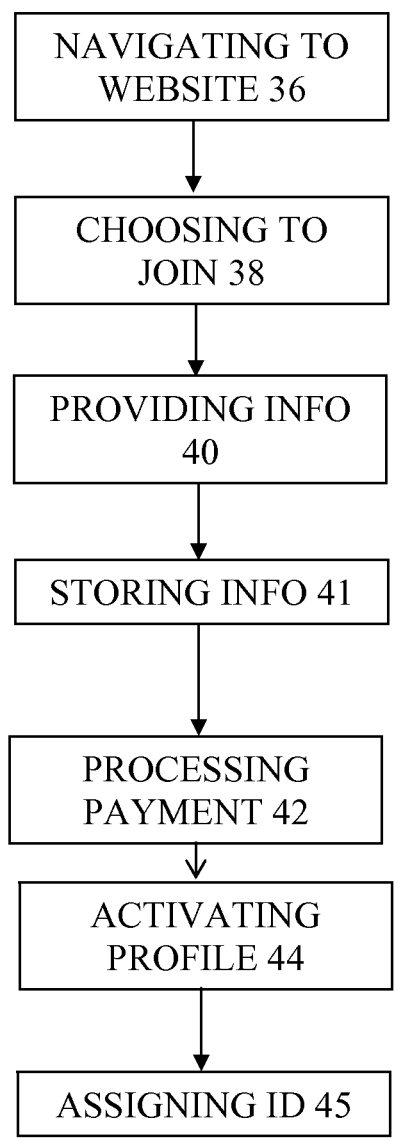
FIG. 2 is a flow chart showing the substeps of the first step of the method of the present invention.

Referring now to FIG. 2, the first step of an initiator developing a profile/account with a central organization 12 preferably includes the following sub-steps: the initiator navigating to a designated website 36, preferably www.cheekd.com; the initiator choosing an option to "join" 38, which is provided on the designated website; the initiator providing information 40, including a valid email address, a password, a code to validate that the initiator is a human and not a machine, billing information, shipping address, and personal profile information; the central organization storing the information provided into an initiator-specific profile 41; the central organization processing payment 42; the central organization activating the initiator's profile 44; and the central organization assigning a unique alphanumeric ID number to the initiator's profile/account 45.

The step of the central organization assigning a unique alphanumeric ID number to the initiator's profile/account 45 may occur as part of the first step of method 10 of an initiator developing a profile/account with a central organization 12, as shown. In some such embodiments, the initiator may create and/or request his own ID number. The initiator may also create and/or request his own ID number when ordering custom decks 34, as described below. The step of the central organization assigning a unique alphanumeric ID number to the initiator's profile/account 45 may also occur as a part of the second step of method 10 of the central organization providing the initiator with a number of cards on which are printed at least an icebreaker, a website designation, and a code 14. In these embodiments, a deck of cards includes an ID number that is then linked to the initiator when the initiator receives and activates the cards. One of ordinary skill in the art will recognize that there are several ways in which a specific initiator profile/account may be linked to a specific card or deck of cards through card-specific and/or initiator-specific codes.

Referring again to FIG. 1, the second step of the central organization providing the initiator with a number of cards on which are printed at least an icebreaker, a website designation, and a code 14 includes the steps of printing at least one card 46 and sending the card to the initiator 48. The printing 46 may be performed by the central organization or may be outsourced to a third party. The printing 46 and sending 48 is preferably of decks of cards with identical or corresponding codes, rather than of single cards. The sending 48 may be through the U.S. postal service, through another mail service, such as UPS, FEDEX, or DHL package and document delivery services, by courier, or by any other delivery service commonly used in the art. The sending 48 may also be to a third party vendor, such as a store, from which the initiator can purchase the cards. The cards preferably also include the central organization's logo, in addition to the icebreaker, website designation, and code. Some cards include a barcode that also carries the code.

In some embodiments, the code included on the card is associated with the initiator's profile/account. The code may be the unique alphanumeric ID number assigned to the initiator's profile/account by the central organization. The code also may be a different code associated with the initiator's profile/account. In other embodiments, the code is not initially associated with the initiator's profile account, and the step of providing the initiator with cards 14 also includes the step of the initiator activating the cards 49 by logging onto his profile/account and entering a code from one of the cards provided to him. This activation links the card or set of cards to the initiator's profile/account.

The code included on the card preferably includes one or more characters that correspond to the icebreaker included on the card. When the code includes one or more characters that correspond to the icebreaker included on the card, the part of the code that corresponds with the initiator's profile/account or that will correspond with the initiator's profile/account once the cards are activated, is the same on every card provided to the initiator, and the part of the code that corresponds with the icebreaker will vary depending on the icebreaker included on the card. When cards are provided to the initiator in decks, every card will have the same code, except in cases where the code includes one or more characters corresponding to the icebreaker, in which case, the part of the code that is not those one or more characters is the same on every card.

The third step is the initiator giving a card to at least one recipient 16. This may be achieved by the initiator handing the card to a recipient or by the initiator using an intermediary to hand the card to a recipient. In embodiments of the present invention where the card is electronic, this step may be achieved by electronically transferring the card 17 via email or via an online social network, such as the FACEBOOK, LINKEDIN, or MYSPACE social networking services, for example.

The fourth step of the recipient going to the website designated on the card 18 entails the recipient navigating to the designated website and the central organization providing instructions via the designated website that prompt the recipient to enter the code from the card.

The fifth step is the recipient entering the code at the designated website 20 as prompted by the website. This step may be achieved by the recipient typing in the code. Alternatively, if the card includes a barcode carrying the code, the step may be achieved by the recipient scanning in the code.

The sixth step is the recipient being given access to the initiator's profile with the central organization 22. This step also entails the central organization sending the initiator an indication that a recipient has been granted access to the initiator's profile 50.

Figure 3:
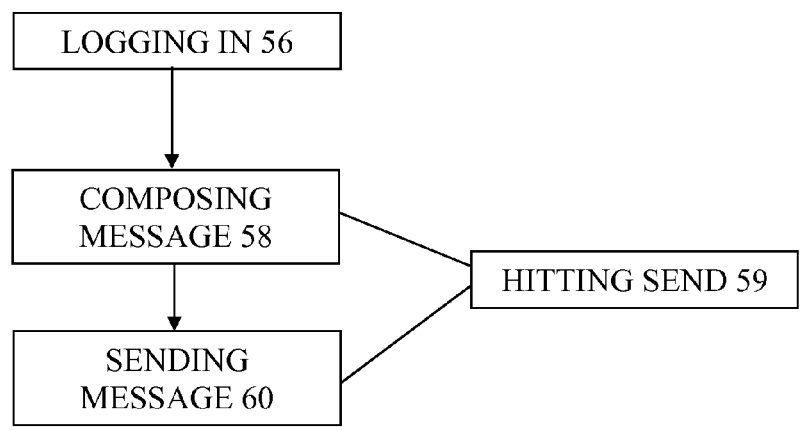
FIG. 3 is a flow chart showing the substeps of the seventh step of the method of the present invention.

Now referring to FIG. 3, the seventh optional step of the recipient sending the initiator a message through the designated website 24 occurs if the recipient wishes to contact the initiator. This step preferably includes the steps of the recipient logging in 56 and composing 58 and sending 60 a message to the initiator through the designated website. In some embodiments, the order of these substeps is as follows: the recipient composing a message 58, the recipient hitting "send" 59, the recipient logging in 56, and the message being sent to the recipient 60. The step of logging in 56 entails the recipient supplying the central organization with an email address and password via the designated website. If the recipient is logging in for the first time, the step also includes the recipient supplying password confirmation and a code to validate that the initiator is a human and not a machine.

Referring again to FIG. 1, if the seventh step occurs, method 10 of the present invention preferably also includes an optional eighth step of the initiator responding to the recipient 26 through the designated website. In no step of method 10 is the recipient provided with a means to contact the initiator other than by messaging through the designated website. The initiator may choose to provide the recipient with his information by including such information in a message sent through the designated website, but this is not a step of method 10 of the present invention, nor is it a function of software 100 of the present invention, as described below.

Preferred method 10 also includes the steps of the central organization billing the initiator 28, the initiator tracking card distribution 30, the initiator tracking activity 32, and the initiator ordering custom decks of cards 34. The step of the central organization billing the initiator 28 entails the central organization using the billing information provided by the initiator during the first step 12 in method 10 to bill the initiator, preferably monthly, for the services provided by the central organization and the initiator paying the bill. If the initiator does not pay the bill, the step also entails deactivating the initiator's profile/account so that neither the initiator nor recipients of the initiator's cards have access to the initiator's profile/account, storing the initiator's profile/account, and reactivating the initiator's profile/account if and when the initiator pays the bill and/or a reactivation fee.

The step of the initiator tracking card distribution 30 preferably includes the steps of the central organization providing an application on the designated website that allows the initiator to enter data corresponding to each card and the initiator entering such data. The application provides the initiator with the icebreaker included on a card, and one or more data entry fields into which the initiator may enter notes corresponding to that icebreaker or card bearing that icebreaker. In some embodiments, the application also provides the initiator with the code included on the card that bears the icebreaker, in addition to the icebreaker. Data that may be entered by the initiator may include the location, date, and time of day of the distribution, a physical description of the recipient, and/or a summary of any verbal exchange that preceded or followed the distribution. The purpose of this step is to aid the initiator in remembering which cards went to which recipients.

The step of the initiator tracking activity 32 entails the central organization recording and providing the initiator with how many times a recipient enters a code and how many times a recipient sends a message to the initiator when presented with a card bearing a specific icebreaker and the initiator considering this data. In this manner, the initiator may track his success based on the icebreaker included on the distributed cards.

The step of the initiator ordering custom decks of cards 34 preferably includes the steps of the central organization providing the initiator with an application on the designated website for customizing which icebreakers are included on the cards included in a deck to be provided to the initiator and how many cards bearing the icebreakers are included in the deck, and the initiator ordering customized decks of cards using this application. The icebreakers chosen by the initiator may be standard icebreakers provided as options by the central organization 52 or they may be icebreakers created by the initiator 54. If the icebreakers are created by the initiator 54, then the method also includes the step of the central organization approving the icebreaker before providing the initiator with cards bearing the icebreaker.

Figure 4:
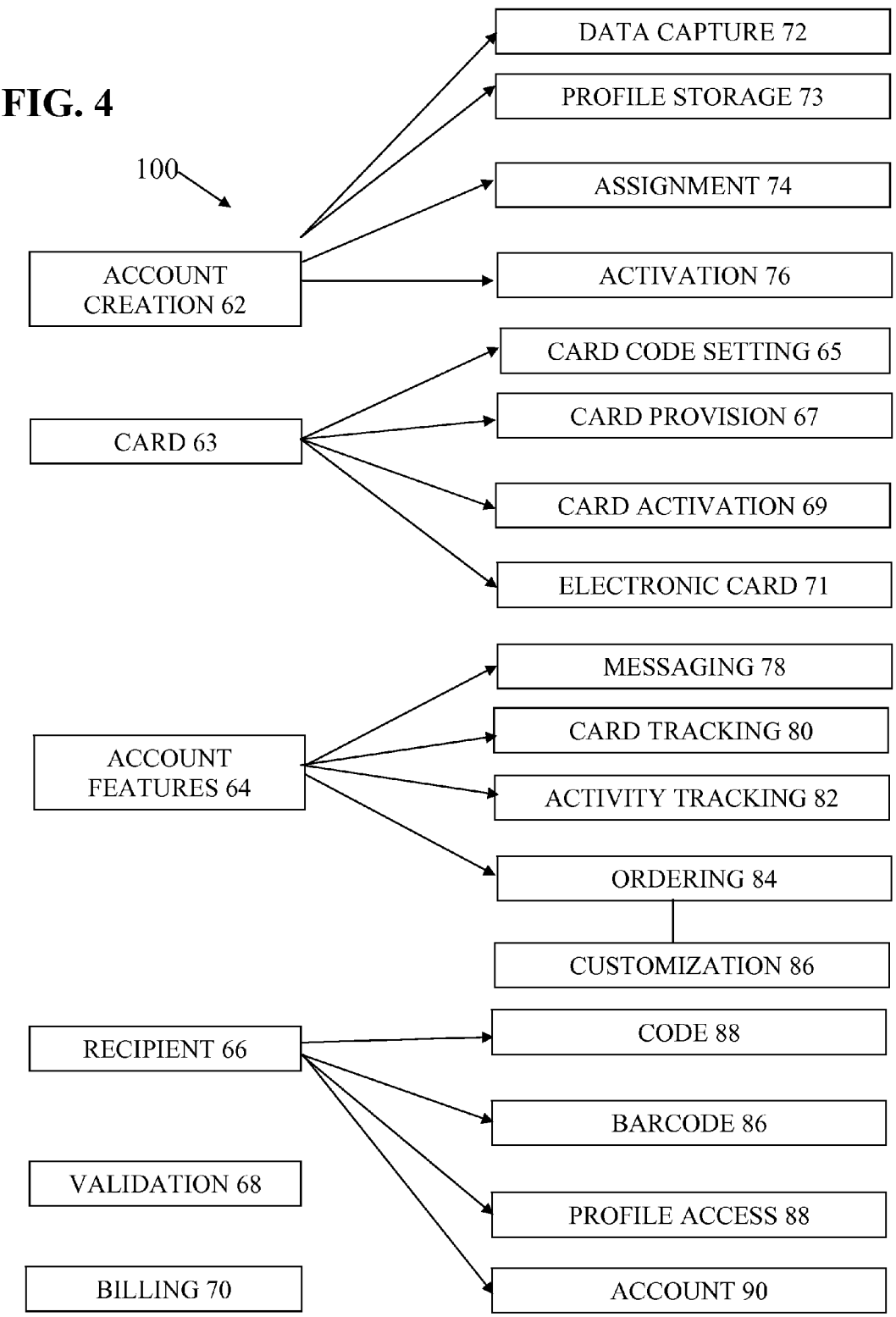
FIG. 4 is a block diagram showing the functionality of the software product of the present invention.

Now referring to FIG. 4, software product 100 of the present invention is stored on a computer readable medium and is executable by a computer. Software product 100 includes account creation software 62, card software 63, account features software 64, recipient software 66, validation software 68, and billing software 70.

Account creation software 62 includes data capture software 72 for providing data capture fields into which the initiator may enter information into the central organization's website; profile storage software 73 for storing information provided by the initiator into an initiator-specific profile/account; assignment software 74 for assigning a unique alphanumeric ID to the initiator-specific profile/account; and activation software 76 for activating, deactivating, or reactivating the initiator's profile/account.

Card software 63 includes card code setting software 65, card provision software 67, card activation software 69, and electronic card software 71. Card code setting software 65 is for developing a code for inclusion on the card that will include both elements corresponding to the icebreaker included on the card and elements corresponding to the initiator. Card provision software 67 is for sending a printer instructions for printing at least one card including the code developed by the card code setting software, a website designation, and the icebreaker to which the code corresponds, and sending the card(s) to a specific destination. Card activation software 69 is for processing input from an initiator including a code from the card(s) and associating the card(s) with the initiator's profile/account. Electronic card software 71 is for creating an electronic card and allowing the electronic transfer of an electronic card from an initiator to a recipient.

Account features software 64 includes messaging software 78, notes software 80, tracking software 82, ordering software 84, and customization software 86. These are features available to the initiator through his account. The messaging software 78 provides a messaging feature that allows the initiator to send and receive messages to and from the central organization and recipients when he signs into his profile/account. Messages from the central organization may include notices about the initiator's profile/account and/or notifications that a recipient has entered a code from a card given to the recipient by the initiator. The notes software 80 provides a note feature that allows the initiator to make notes about the distribution of a specific card within his account. The tracking software 82 tracks how many recipients entered a code and/or sent a message to the initiator based on the icebreaker on the card provided to the recipient and provides the initiator with this data. The ordering software 84 provides an ordering feature allowing the initiator to order decks of cards. The customization software 86 is part of the ordering code that allows the initiator to order decks of cards made up of initiator-specified quantities of cards bearing an initiator-specified icebreaker.

Recipient software 66 includes code software 88, barcode software 90, profile access software 92, and account software 94. Code software 88 provides the recipient with a data capture field to type in the alphanumeric code included on the card given to the recipient and allows the central organization to associate that code with the initiator. Barcode software 90 allows the central organization to read a barcode scanned from a card given to a recipient and associate that code with the initiator. Profile access software 92 allows the recipient access to the profile information provided by the initiator after the recipient has entered the code on the card provided to him by the initiator. Account software 94 allows the recipient to create an account by entering his email address, password, and password confirmation and to indicate an already created account by reentering the email address and password.

Validation software 68 is for verifying that an initiator creating a profile/account and/or a recipient interested in sending an initiator a message is a human, rather than a machine by providing a data capture field for a code to be entered by the initiator or recipient.

Billing software 70 is for billing the initiator.

Figure 5A:
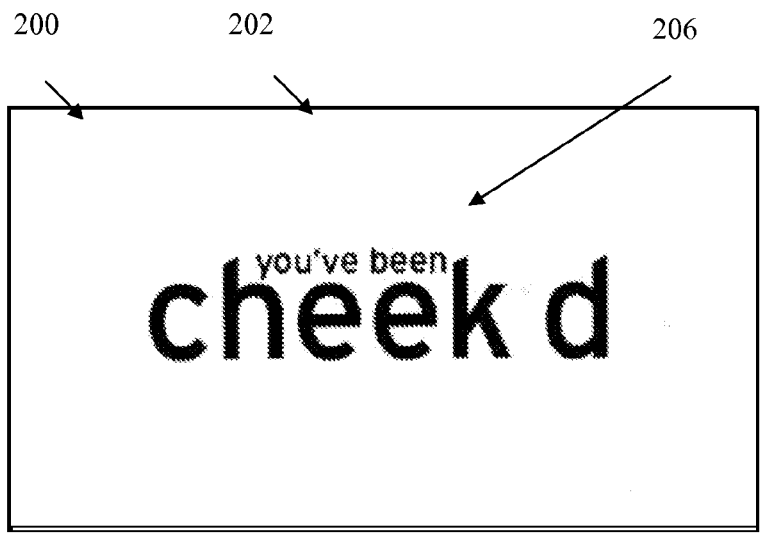
FIG. 5A is a depiction of one side of a preferred card of the present invention.
Figure 5B:
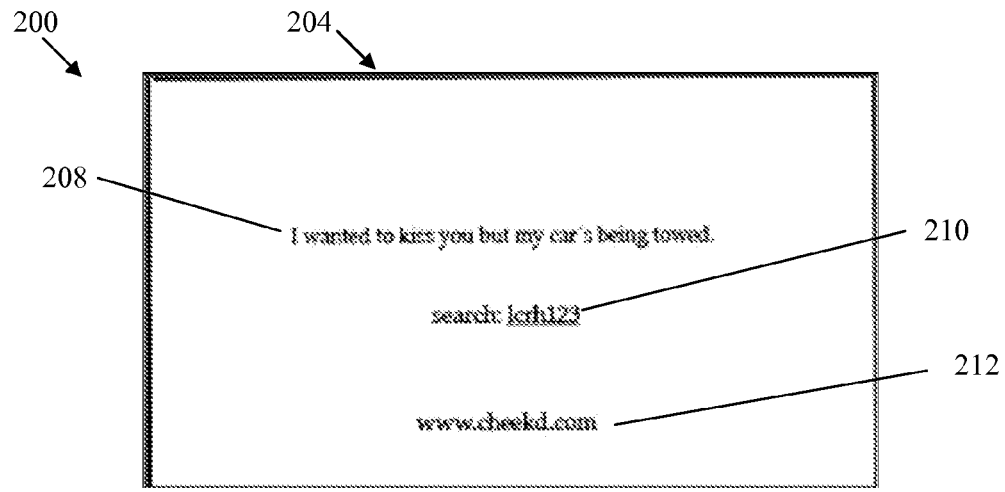
FIG. 5B is a depiction of the other side of a preferred card of the present invention.

Referring now to FIGS. 5A and 5B, in its most basic form, the card 200 of the present invention includes at least an icebreaker 208, a code 210, and a website designation 212. Card 200 is an example of a card that may be used in method 10 of the present invention. Cards 200 are preferably similar to standard business cards in size, shape, and dimensions, and include the icebreaker 208, code 210, and website address 212 on a first side of the card 204, as shown in FIG. 5B, and a company logo 206 on a second side 202, as shown in FIG. 5A. In practice, an initiator will personally present card 200 to a recipient when card 200 is a physical card. In some embodiments, card 200 is not physical, but electronic. When card 200 is electronic, an initiator presents card 200 electronically to a recipient via email or FaceBook, for example. The recipient may go to website URL 212 and enter code 210 to see the initiator's profile and potentially send the initiator a message.

Code 210 is preferably an alphanumeric code or a barcode. Some cards 200 may include both an alphanumeric code and a barcode corresponding to the alphanumeric code. It is preferred that part of code 210, two of eight characters in an alphanumeric code, for example, correspond to icebreaker 208 included on card 200. This part of code 210 will vary from card to card, depending on icebreaker 208 included on card 200. The remainder of code 210 is preferably associated with an initiator account and is the same on every card in a deck. Before a deck has been activated by an initiator, the part of code 210 not corresponding to icebreaker 208 is preferably not associated with a specific initiator. Once the initiator receives the deck of cards 200, he may activate the cards 200 through his account, and in this way marry code 210 to his account.

Icebreaker 208 may be any of several provided by the central organization or may be created by the initiator, pending central organization approval. Icebreakers 208 included on the cards 200 of the deck and the quantity of cards bearing a certain icebreaker 208 may be assigned by the central organization. Alternatively, the initiator may specify the quantity of cards 200 bearing specific icebreakers 208 that are included in a deck. Icebreaker 208 as shown in FIG. 5B is one example of several icebreakers 208 provided by the central organization.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

We claim:

1. A method for personal meeting comprising the steps of:
an initiator developing a profile with a central organization;
the central organization providing the initiator by computer with a number of cards on which are printed at least an icebreaker, a website designation, and a code comprising elements corresponding to the icebreaker printed on the card;
the initiator giving the card to at least one recipient;
the recipient going to the website designated on the card;
the recipient entering the code printed on the card at the designated website;
the recipient being given access to the initiator's profile with the central organization;
the recipient sending a message to the initiator; and
the initiator tracking activity comprising:
the central organization storing data by computer corresponding to when the recipient enters the code from the card bearing the specific icebreaker;
the central organization storing data by computer corresponding to when the recipient sends the message to the initiator after the recipient has received the card bearing the specific icebreaker;
the central organization compiling data by computer corresponding to a number of times the recipient enters the code from the card bearing the specific icebreaker and a number of times the recipient sends the message to the initiator after the recipient has received the card bearing the specific icebreaker; and
the central organization displaying the compiled data by computer to the initiator.

2. A software product stored on a non-transitory computer readable medium and executable by a computer for use in conjunction with an exchange from an initiator to a recipient of a card on which is printed at least an icebreaker, a website designation, and a card code, comprising:
account creation software comprising:
data capture software that displays data capture fields for an initiator input;
profile storage software that stores the initiator input into an initiator profile;

assignment software that assigns a profile code to the initiator profile; and activation software that activates the initiator profile;

card software comprising:
- card code setting software for developing the card code comprising elements corresponding to the icebreaker and elements corresponding to the initiator; and
- card provision software that sends instructions for the printing of at least one card and the delivery of at least one card to a destination;

account features software comprising messaging software that allows messages to be sent by the recipient to the initiator;

recipient software comprising:
- code software that displays a data capture field for capturing the card code printed on the card;
- profile access software that matches the card code with the initiator and grants the recipient access to the initiator profile; and
- account software that displays data capture fields for creating a recipient account;

validation software that verifies that the recipient is a human;

activity tracking software comprising:
- software that stores data corresponding to when the recipient enters the card code from the card bearing the specific icebreaker;
- software that stores data corresponding to when the recipient sends the message to the initiator after the recipient has received the card bearing the specific icebreaker;
- software that compiles data corresponding to a number of times the recipient enters the card code from the card bearing the specific icebreaker and a number of times the recipient sends the message to the initiator after the recipient has received the card bearing the specific icebreaker; and
- software that displays the compiled data to the initiator for viewing; and billing software that bills the initiator.

* * * * *